US008544790B2

(12) United States Patent
   Afanasyev

(10) Patent No.: US 8,544,790 B2
(45) Date of Patent: Oct. 1, 2013

(54) AIRCRAFT

(76) Inventor: Sergey Nikolaevich Afanasyev, Moscow (RU)

( * ) Notice: Subject to any disclaimer, the term of this patent is extended or adjusted under 35 U.S.C. 154(b) by 115 days.

(21) Appl. No.: 13/377,895

(22) PCT Filed: Jun. 1, 2009

(86) PCT No.: PCT/RU2009/000275
§ 371 (c)(1),
(2), (4) Date: Dec. 15, 2011

(87) PCT Pub. No.: WO2010/074595
PCT Pub. Date: Jul. 1, 2010

(65) Prior Publication Data
US 2012/0104179 A1    May 3, 2012

(51) Int. Cl.
*B64C 3/56* (2006.01)
(52) U.S. Cl.
USPC ................................ 244/49; 244/46; 244/3.29
(58) Field of Classification Search
USPC .............................................. 244/49, 46, 3.29
See application file for complete search history.

(56) References Cited

U.S. PATENT DOCUMENTS

| 1,448,166 | A | * | 3/1923 | Strong | 244/3.29 |
| 3,680,816 | A | | 8/1972 | Mello | |
| 5,074,493 | A | * | 12/1991 | Greenhalgch | 244/3.27 |
| 5,192,037 | A | * | 3/1993 | Moorefield | 244/46 |
| 5,417,393 | A | * | 5/1995 | Klestadt | 244/3.27 |
| 5,495,999 | A | | 3/1996 | Cymara | |
| 7,090,163 | B2 | * | 8/2006 | Rastegar et al. | 244/3.28 |
| 7,681,832 | B2 | * | 3/2010 | Colclough | 244/12.2 |
| 8,367,993 | B2 | * | 2/2013 | Velez et al. | 244/3.28 |

FOREIGN PATENT DOCUMENTS

RU    2 180 309    3/2002

OTHER PUBLICATIONS

International Search Report of PCT/RU2009/000275, Feb. 11, 2010.

\* cited by examiner

*Primary Examiner* — Christopher P Ellis
(74) *Attorney, Agent, or Firm* — Collard & Roe, P.C.

(57) ABSTRACT

The aircraft includes a fuselage, horizontal front and tail empennages and take-off and landing wings, which wings are jointed to the fuselage by means of attachment joints, the axes of which are situated above the fuselage central line along the longitudinal axis of symmetry thereof so that the take-off and landing wings are arranged below the attachment joints along the longitudinal axis of symmetry of the fuselage. The outer surface of the wings is the extension of the outer surface of the fuselage and in a stow position the take-off and landing wings cover at least 30% of the fuselage surface area between the horizontal front and tail empennages.

5 Claims, 5 Drawing Sheets

AIRCRAFT

CROSS REFERENCE TO RELATED APPLICATIONS

This application is the National Stage of PCT/RU2009/000275 filed on Jun. 1, 2009. The international application under PCT article 21(2) was not published in English.

FIELD OF THE INVENTION

The invention relates to the aircraft industry and may be used for building supersonic and subsonic aircraft lifting different payloads and serving different purposes.

BACKGROUND OF THE INVENTION

A prior art aircraft comprises four takeoff and landing wings (canards) that are retracted flush into the aircraft fuselage surface in cruising flight (U.S. Pat. No. 5,495,999, Mar. 5, 1996). The prior art takeoff and landing wings have two degrees of freedom in the extended position and create additional lift for the aircraft at takeoff and landing.

The prior art takeoff and landing wings support the nose part of the aircraft at low speeds and serve as stabilizers in longitudinal trim, that is, these takeoff and landing wings are not the main aerodynamic elements and only fulfill auxiliary functions. This design is deficient because the two degrees of freedom of each fitting unit (platform) complicate the unit design and make it unreliable. The fitting unit of a takeoff and landing wing of this design is exposed to large aerodynamic loads and for this reason has a large size and weight.

A significant deficiency of this aircraft design is that the main classical fixed wings generate a large drag coefficient (Cx) at high speeds and cause unavoidably significant fuel consumption at cruising speeds.

SUMMARY OF THE INVENTION

In the claimed aircraft design, the function of the main classical fixed wings is fulfilled by takeoff and landing wings capable of being integrated into the fuselage surface at cruising speeds and, therefore, reducing to the greatest extent possible the Cx of the aircraft and lowering fuel consumption to a minimum in the cruising configuration. The fitting unit of each takeoff and landing wing has a single degree of freedom, making the takeoff and landing wing design simpler and more reliable.

This technical result is achieved by giving .the takeoff and landing wings a shape invariable in cross-section, the shape of the outer surface of the takeoff and landing wings being fully identical to the shape of the outer surface of the fuselage such that the outer surface of the takeoff and landing wings in the integrated position thereof is an extension of the outer surface of the fuselage, making the aircraft design integral in the cruising configuration.

DESCRIPTION OF AN EMBODIMENT OF THE INVENTION

Figure 1:
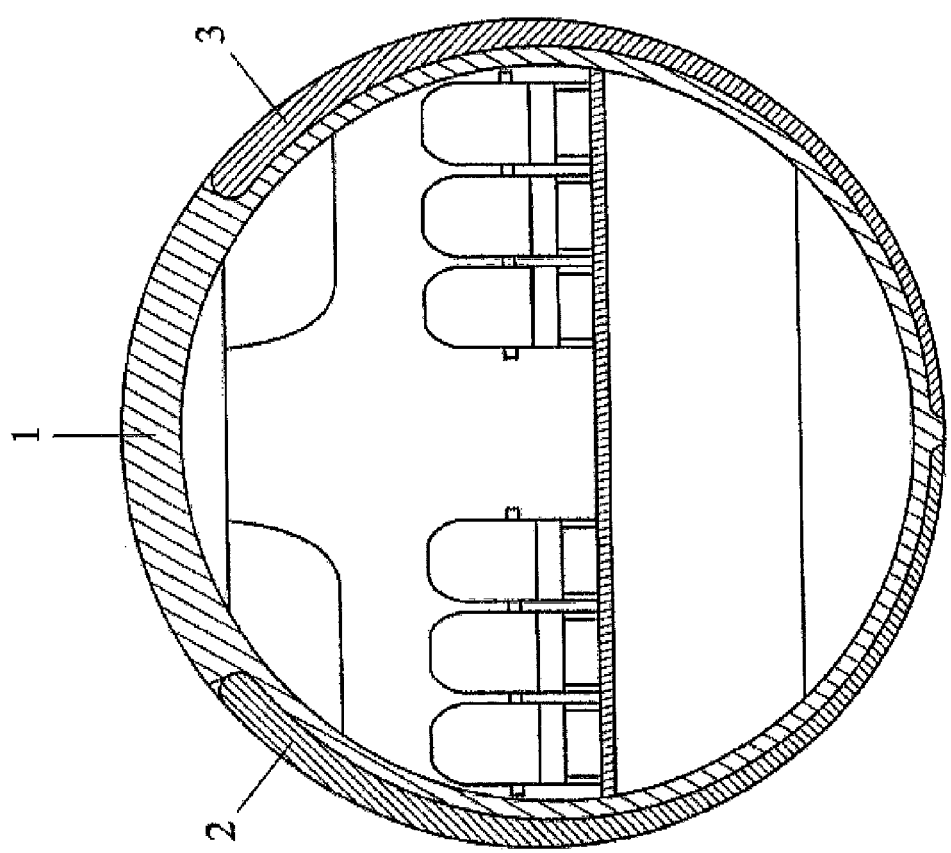
FIG. 1 is a cross-sectional view of the aircraft fuselage, with the takeoff and landing wings folded.
Figure 2:
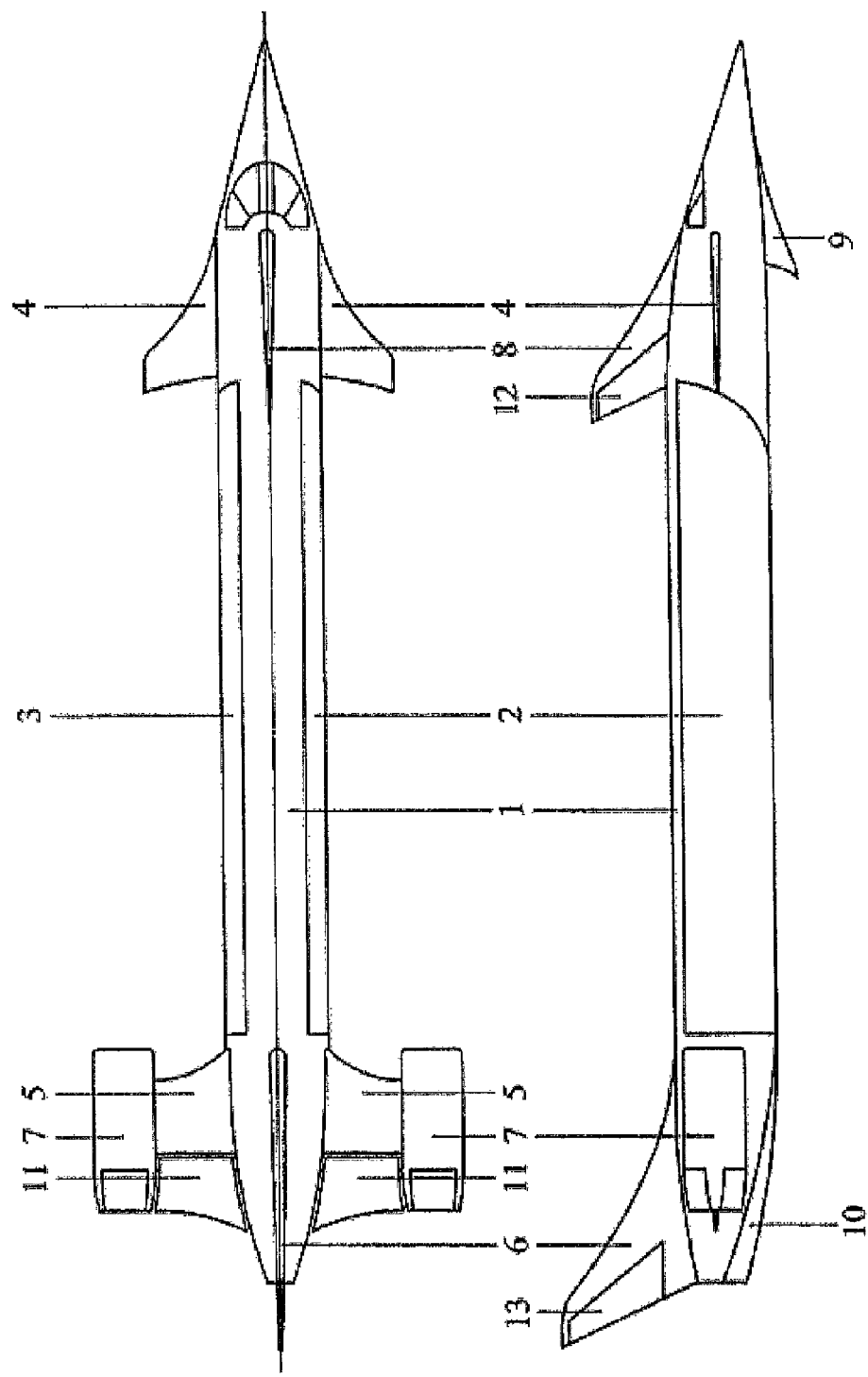
FIG. 2 are a top and side views of an aircraft in the cruising configuration.

According to the idea of the invention, the aircraft comprises a fuselage 1 and main elements of the aircraft, in particular, takeoff and landings wings (FIGS. 1, 2, 3, and 4), horizontal nose stabilizers 4, horizontal tail stabilizers 5, vertical tail fin 6, and engines 7 (FIG. 2). The aircraft further comprises a vertical nose fin 8, forward ventral fin 9, and a tail ventral fin 10 (FIG. 2). Horizontal nose stabilizers 4 function as fully controlled elevators. Horizontal tail stabilizers 5 serve as pylons for engines 7. Horizontal tail stabilizers 5 are provided with ailerons 11 having turning actuators thereof located within the airtight part of the fuselage. Vertical nose fin 8 is provided with twin-section rudder surfaces 12 functioning as a yaw rudder and spoilers. Vertical tail fin 6 is provided with twin-section rudder surfaces 13 functioning as a yaw rudder and spoilers. When activated, the two sections of rudder surface 12 are deflected in the opposite direction to the deflection of the two sections of rudder surface 13 to effectively control the yaw of the aircraft at all stages of the flight. When the spoilers are activated, the two sections of each twin-section rudder surface 12 and 13 are deflected in opposite directions to effectively reduce the aircraft speed.

Figure 3:
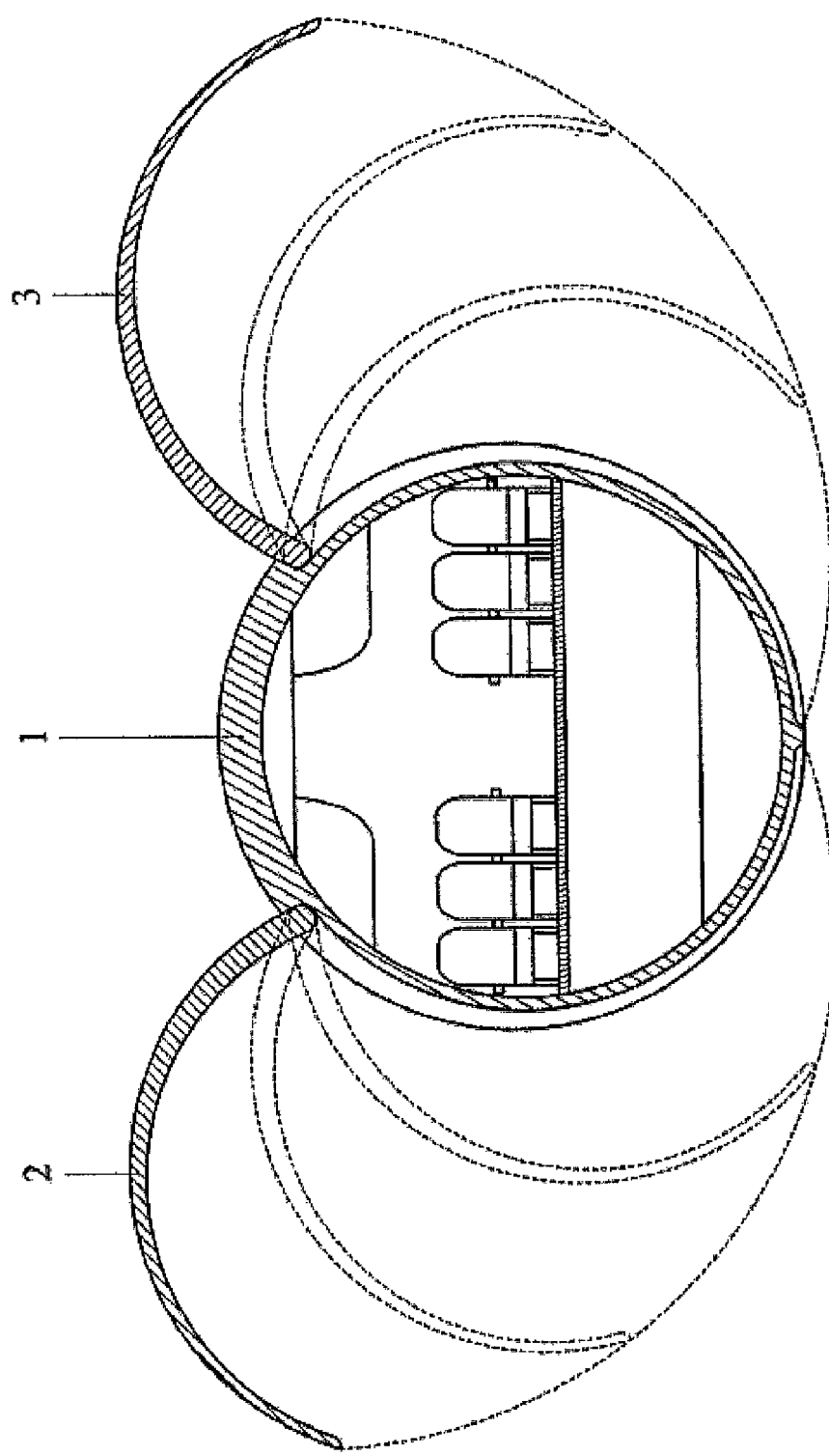
FIG. 3 is a cross-sectional view of the aircraft fuselage, with the takeoff and landing wings raised to the unfolded position. The dotted lines show intermediate positions of the takeoff and landing wings as they are raised to the takeoff or landing position.

Takeoff and landing wings 2 and 3 are connected to fuselage 1 through fitting units having shafts that possess one degree of freedom and are positioned above the median line of the fuselage along the longitudinal line of symmetry thereof (FIGS. 1, 2, and 3). The median line of the fuselage is the line extending in the horizontal plane and dividing the height of the fuselage cross-section in half. The shafts of the fitting units permit the takeoff and landing wings to turn into their unfolded position (FIGS. 3 and 4) at takeoff and landing or into their folded position at cruising speeds in flight and at parking. In their folded position, the takeoff and landing wings are below the fitting units along the longitudinal surface of the fuselage, and the outer surface of the takeoff and landing wings is an extension of the outer surface of the fuselage (FIGS. 1 and 2). When folded in, takeoff and landing wings 2 and 3 cover at least 30% of the area of the fuselage surface between the horizontal nose stabilizers and the horizontal tail stabilizers (FIG. 2). The longitudinal axis of symmetry of the fuselage is the longitudinal axis of symmetry of the fuselage in plan.

Each takeoff and landing wing has a row of slots 14 (FIG. 5) provided near the central line of takeoff and landing wing 3, along the path of the airflow, and serving to improve the airflow over the outer surface of the takeoff and landing wings from the inner and outer peripheries to the central line of the takeoff and landing wings. A significant distinction of this design of takeoff and landing wings is that after the air has flowed over the outer surface of a takeoff and landing wing, it is forcibly lost in the narrow zone of the takeoff and landing wings along the longitudinal row of slots 14. Slots 14 are provided on the outside of the takeoff and landing wings with flaps 15 (FIG. 5), the outer surface of the flaps being an extension of the outer surface of the takeoff and landing wings in the closed position of the flaps. Flaps 15 are spring-biased to close and can be opened by the air pressure differential or actuated to open and close by physical force. Flaps 15 are closed toward the fitting units of the takeoff and landing wings.

Each takeoff and landing wing has a row of slots 16 (FIG. 5) near the fitting units along the airflow, said row of slots being intended to improve the airflow over the outer surface of the takeoff and landing wing. The shape of the inner walls of the slots helps direct the airflow along the outer surface of the takeoff and landing wing toward the central line thereof. Slots 16 are provided on the outside of the takeoff and landing wings with flaps 17 (FIG. 5), the outer surface of the flaps in closed position serving as an extension of the outer surface of the takeoff and landing wing. Flaps 17 are spring-biased to close and can be opened by the air pressure differential or are actuated to open and close by physical force. Flaps 17 are closed toward the central line of the takeoff and landing wing.

Figure 5:
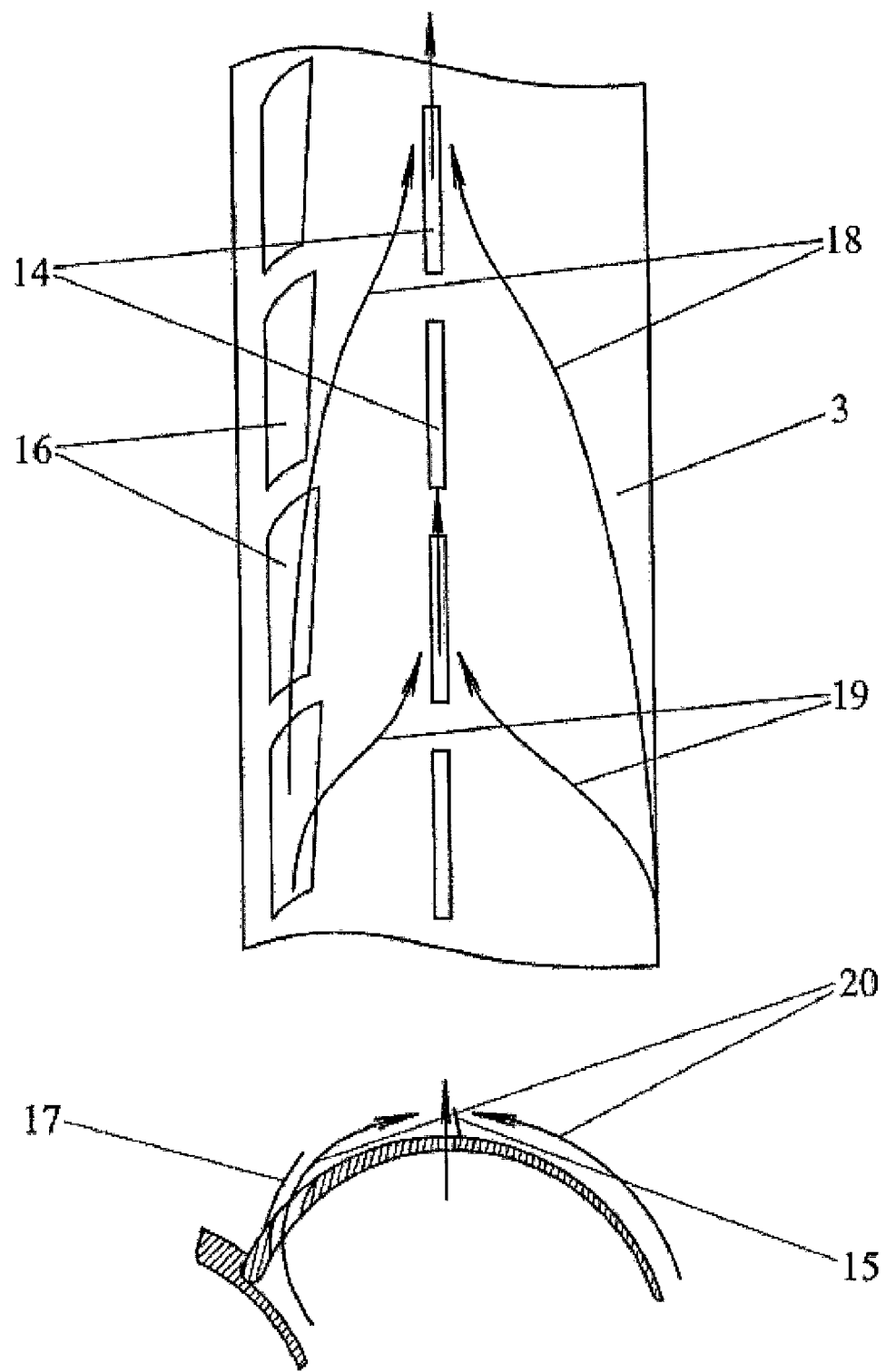
FIG. 5 is a top view and a cross-sectional view of the left takeoff and landing wing. The arrows indicate the direction of airflows on the outer side of the takeoff and landing wing.

At operating angles of attack, air flows over the outer surface of the takeoff and landing wings along lines 18 (FIG. 5). At 30° angle of attack, air flows over the outer surface of the takeoff and landing wings along lines 19 that assure a low probability of early loss of airflow before it reaches the central line of the wing, and 30° is, therefore, the preferred angle of attack for this aircraft design. Even if the aircraft plunges vertically, at a 90° angle of attack, air would flow over the outer surface of the takeoff and landing wings along lines 20 (FIG. 5), replicating the outer lines of airflow over the canopy of the classical parachute, that is, a wing of this design is capable of producing lift at angles of attack ranging from 1° to 90°. A simpler takeoff and landing wing may lack a longitudinal row of slots 16. This wing design is simpler from the viewpoint of aerodynamic airflow over the outer surface, but is more stable under high aerodynamic loads.

A wing of this design in the takeoff and landing position (FIG. 3) lacks lateral airflow typical of a sweptback wing. When the takeoff and landing wings are unfolded, the lift points are significantly higher than the aircraft center of gravity (FIG. 3), giving the aircraft a good roll stability for a short wingspan. When unfolded, takeoff and landing wings 2 and 3 do not obstruct the engines (FIG. 4), contributing to stable engine operation in all flight phases. Takeoff and landing wings of this design are aerodynamically perfect, and their aerodynamic quality is improved for this reason. When unfolded, takeoff and landing wings 2 and 3 are fixed in fuselage locks and, therefore, reduce load on the wing unfold-fold mechanism in flight. When folded down, the longitudinal outer wing parts of the left and right takeoff and landing wings area positioned in close proximity (FIG. 1), so the fuselage locks can be used to double-fix the longitudinal outer wing parts of the left and right takeoff and landing wings in the folded position. The lock actuators for fixing the wings in the folded position are located in the airtight zone of the fuselage and are provided with emergency opening devices, with the incoming airflow helping to move the wings to the landing position and, therefore, make the aircraft safer to operate.

Figure 4:
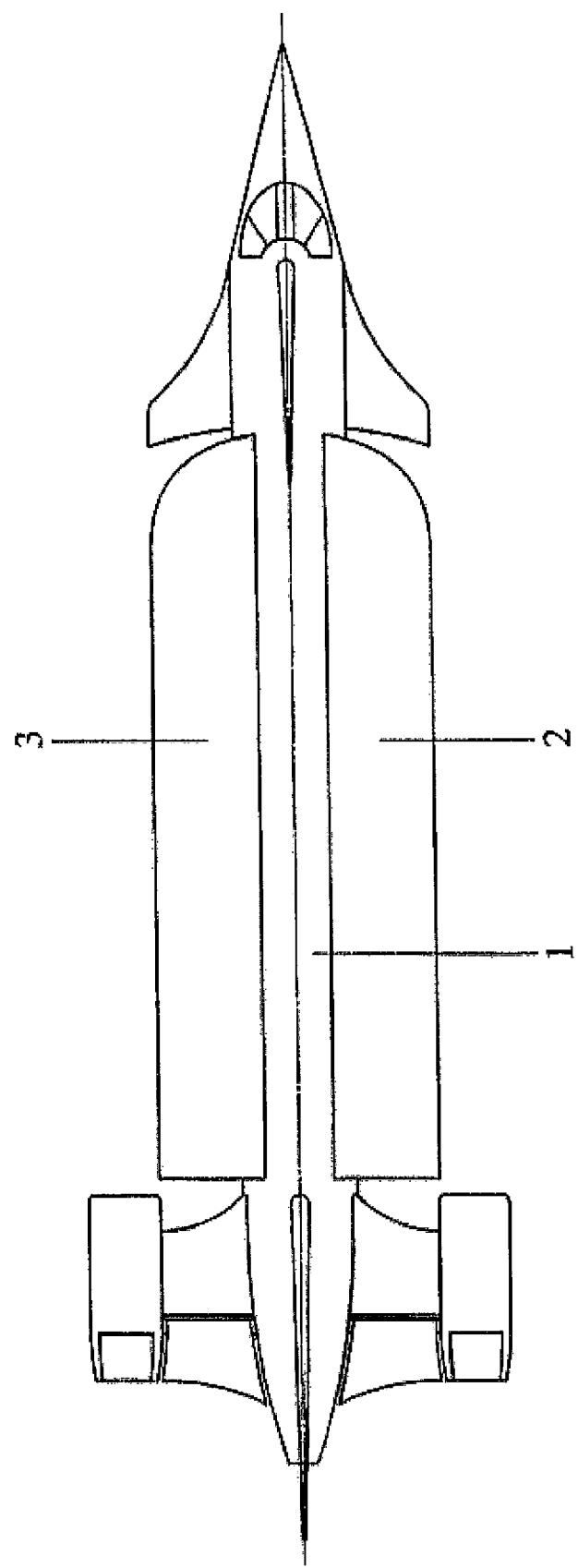
FIG. 4 is a top view of an aircraft with takeoff and landing wings unfolded for takeoff or landing.

Takeoff and landing wings 2 and 3 are folded down for long parking periods (FIGS. 1 and 2). Wings 2 and 3 are unfolded during short aircraft parking periods and preparations for flight, providing unobstructed approach to doors and cargo hatches (FIGS. 3 and 4). When the aircraft takes off, takeoff and landing wings 2 and 3 are unfolded (FIGS. 3 and 4), The rudders of the vertical nose fin and the vertical tail fin that turn in coordination make yaw control of the aircraft easy at takeoff in strong crosswind and at a low friction coefficient of the runway. In an aircraft of classical design, with the elevator provided in the tail section of the aircraft, the elevator put over to pitch the aircraft nose up produces a negative lift and causes the total lift to decrease as the aircraft starts to climb. In the claimed aircraft, the elevator put over to pitch-up generates a positive lift and causes the total lift of the aircraft to increase as the aircraft starts to climb. These design specifics make the claimed aircraft safer compared to the classical aircraft design. As the aircraft takes off and lands, ailerons 11 (FIG. 2) are in the high-pressure zone produced by the takeoff and landing wings, for which reason the ailerons are efficient at takeoff and landing even if they are positioned on a small arm. The takeoff and landing wings are folded after takeoff as the aircraft basic speed rises. After the takeoff and landing wings have been folded completely (FIGS. 1 and 2), the aircraft basic speed is sufficient for the aircraft to use the horizontal nose stabilizers and horizontal tail stabilizers to fly, whereupon the aircraft is accelerated to cruising speed. As the takeoff and landing wings are folded, they are fixed in the folded position by the fuselage locks and the aircraft Cx can be reduced to a minimum possible value. In the cruising configuration, takeoff and landing wings 2 and 3 (FIG. 2) are folded, and Cx of the aircraft can, therefore, be reduced to the minimum possible. Also in the cruising configuration, the efficiency of the ailerons positioned on a small arm is maintained by high-speed air pressure. The cruising configuration of an aircraft of the claimed design is identical to the configuration of a cruise missile that raises no doubts regarding its easy control and high flight performance characteristics. A system of spoilers consisting of two sections of the vertical nose fin and two sections of the vertical tail fin provides effective braking as the basic fight speed is reduced and the vertical descent rate of the aircraft increases. In preparation for landing, the basic speed of the aircraft is lowered to a reasonable air pressure value, whereupon the takeoff and landing wings are released from the fuselage locks fixing them in the folded position and are unfolded to the landing position (FIGS. 3 and 4) as the basic speed of the aircraft is lowered to landing speed. A low crosswind blowing as the aircraft lands would cause the two sections of the vertical nose fin and the two sections of the vertical tail fin to be activated to fulfill spoiler functions and open to maximum angles for effectively braking the aircraft, the two sections of the vertical nose fin pressing the nose landing gear against the runway and giving the aircraft good yaw stability during the landing run. A significant crosswind blowing as the aircraft lands would cause the two sections of the vertical tail fin to fulfill spoiler functions and open to maximum angles and the two sections of the vertical nose fin to continue functioning as yaw rudder to maintain good yaw stability of the aircraft during the landing run in a crosswind. This aircraft configuration is also efficient for landing on a runway having a low friction coefficient. When parked, the aircraft of this design is significantly smaller than the classical aircraft. Even with its takeoff and landing wings unfolded, the parking size of the aircraft does not increase (FIG. 4). This technical distinction helps reduce the overall dimensions of the aircraft and make its parking area significantly smaller and enables aircraft of this design to operate from an aircraft carrier.

Designers of a new aircraft model always give thought to the possibility of an aircraft being pulled out of a spin. Where an aircraft of this design goes into a spin at cruising speed, its pilot may supplement his standard actions with unfolding the takeoff and landing wings into the landing position. With its wings in the takeoff-landing position, the aircraft has a good stability to sideslip, so when the takeoff and landings wings are unfolded the aircraft regains its yaw stability, which is extremely important because sideslip is one of the causes of a flat spin. A wing of this design being capable of producing a lift at as large an angle of attack as 90°, the lift points lie significantly above the aircraft's center of gravity (FIG. 3), high enough for the aircraft to regain roll stability. The total area of horizontal tail stabilizers 5, engines 7, and ailerons 11 is larger than that of horizontal nose stabilizers 4 (FIG. 2), and, therefore, the yaw and roll stabilization of a midpoint-heavy aircraft would be followed by pitch stabilization as well, in which case elevator 4 put over to nose-down pitching would contribute to a smooth lowering of the aircraft nose and nose-down pitching thereof, followed be a rise in the basic speed and in-flight stabilization of the aircraft. The small wingspan and considerable length of connection between the takeoff and landing wings and the fuselage through fitting units and the wings fixed in the fuselage locks in the landing position enable the aircraft to take very high aerodynamic loads as it pulls out of the spin.

RÉSUMÉ

The claimed aircraft design is quite simple and reliable, and is the best choice for flights at supersonic speeds. The most rational aircraft of this design is intended for cruising at Mach numbers of 0.95 to 0.99. An aircraft of this design has a minimum possible Cx value in the cruising configuration, for which reason it would require significantly less fuel than classical aircraft in the same class. Wide-scale use of titanium alloys and composite materials, and also smaller quantities of fuel needed on board help develop an aircraft flying at reasonable speeds and yielding significant economic benefits. The high environmental standards aircraft are to meet by reducing harmful emissions into the atmosphere make this aircraft design a preferred choice. This design can be used for developing aircraft operating from aircraft carriers and for building a piloted space shuttle.

What is claimed is:

1. An aircraft comprising a fuselage and main aircraft elements connected thereto, in particular, takeoff and landing wings; horizontal nose stabilizers; horizontal tail stabilizers; vertical tail fin, and engines, the takeoff and landing wings being connected to the fuselage through fitting units having shafts possessing one degree of freedom and positioned above the middle line of the fuselage along the longitudinal axis of symmetry thereof for the takeoff and landing wings to turn relative to their respective axes of the fitting units for moving the takeoff and landing wings to the unfolded position thereof at takeoff and landing or to the folded position in cruising flight and at parking, the takeoff and landing wings being positioned when folded below the fitting units along the longitudinal axis of symmetry of the fuselage, the outer surface of the takeoff and landing wings being extensions of the outer surface of the fuselage, and the folded takeoff and landing wings covering at least 30% of the area of the fuselage surface between the horizontal nose stabilizers and the horizontal tail stabilizers.

2. The aircraft as claimed in claim 1, wherein each takeoff and landing wing has a longitudinal row of slots near the central line of the takeoff and landing wing, along the path of the airflow.

3. The aircraft as claimed in claim 2, wherein the slots are provided on the outer side of the takeoff and landing wing with flaps, the outer surface of the closed flaps being an extension of the outer surface of the takeoff and landing wing, the flaps being spring-biased to be closed and being opened by the force of the air pressure differential or activated to open and close by physical force, and the flaps being closed toward the fitting units of the takeoff and landing wing.

4. The aircraft as claimed in claim 1, wherein each takeoff and landing wing has a longitudinal row of slots near the fitting units, along the airflow, the shape of the inner walls of the slots directing the airflow along the outer surface of the takeoff and landing wing toward the central line thereof.

5. The aircraft as claimed in claim 4, wherein the slots are provided on the outer side of the takeoff and landing wing with flaps, the outer surface of the flaps in the closed position thereof being an extension of the outer surface of the takeoff and landings wing, the flaps being spring-biased to be closed and being opened by the force of the air pressure differential or activated to open and close by physical force, and the flaps being closed toward the central line of the takeoff and landing wing.

* * * * *

UNITED STATES PATENT AND TRADEMARK OFFICE
CERTIFICATE OF CORRECTION

PATENT NO. : 8,544,790 B2                                            Page 1 of 1
APPLICATION NO. : 13/377895
DATED         : October 1, 2013
INVENTOR(S)   : Sergey Nikolaevich Afanasyev It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 129 days.

Signed and Sealed this
Fifteenth Day of September, 2015

Michelle K. Lee
*Director of the United States Patent and Trademark Office*